(12) United States Patent
Benbouhout

(10) Patent No.: US 10,730,356 B2
(45) Date of Patent: Aug. 4, 2020

(54) ELECTRONIC UNIT OF A SYSTEM FOR MONITORING TYRE PARAMETERS EQUIPPED WITH A RECHARGEABLE ELECTRICAL SUPPLY MEANS

(71) Applicants: Continental Automotive France, Toulouse (FR); Continental Automotive GmbH, Hannover (DE)

(72) Inventor: Rachid Benbouhout, Cugnaux (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/340,464

(22) PCT Filed: Nov. 17, 2017

(86) PCT No.: PCT/FR2017/053147
§ 371 (c)(1),
(2) Date: Apr. 9, 2019

(87) PCT Pub. No.: WO2018/091839
PCT Pub. Date: May 24, 2018

(65) Prior Publication Data
US 2020/0047565 A1 Feb. 13, 2020

(30) Foreign Application Priority Data

Nov. 21, 2016 (FR) ..................... 16 61260

(51) Int. Cl.
*H02J 7/00* (2006.01)
*B60C 23/04* (2006.01)
*H02J 7/02* (2016.01)

(52) U.S. Cl.
CPC ........ *B60C 23/041* (2013.01); *B60C 23/0488* (2013.01); *B60C 23/0494* (2013.01);
(Continued)

(58) Field of Classification Search
None
See application file for complete search history.

(56) References Cited

U.S. PATENT DOCUMENTS 3,453,590 A    7/1969  Burgess et al.
5,774,048 A *  6/1998  Achterholt .......... B60C 23/0408
                                                    340/442
(Continued)

FOREIGN PATENT DOCUMENTS

CN    102176647 A    9/2011
CN    103253094 A    8/2013
(Continued)

OTHER PUBLICATIONS

English translation of the Written Opinion for International Application No. PCT/FR2017/053147, dated Jan. 8, 2018, 4 pages.
(Continued)

*Primary Examiner* — Peter J Macchiarolo
*Assistant Examiner* — Jermaine L Jenkins
(74) *Attorney, Agent, or Firm* — RatnerPrestia

(57) ABSTRACT

An electronic unit that is intended to be mounted on the valve of a vehicle wheel fitted with a tire, incorporating electronics for monitoring at least one operating parameter of the wheel and a rechargeable power supply for supplying power to the electronics, including a device for charging the rechargeable power supply, the device for charging including: a movable element, at least a portion of which is magnetized, that is capable of being set in motion by an air flow for inflating the tire that passes through the valve and cooperating with a coil so as to produce variations in the magnetic field and electromagnetic induction; and a device for managing the charging of the rechargeable power supply.

10 Claims, 3 Drawing Sheets

(52) U.S. Cl.
CPC ............... *H02J 7/00* (2013.01); *H02J 7/022* (2013.01); *B60C 23/0447* (2013.01); *H02J 2207/20* (2020.01)

(56) References Cited

U.S. PATENT DOCUMENTS

| | | | | |
|---|---|---|---|---|
| 6,958,684 | B2* | 10/2005 | Lin | B60C 23/0408 340/445 |
| 7,218,210 | B2* | 5/2007 | Schoenberger | B60C 23/0405 116/34 A |
| 8,186,209 | B2* | 5/2012 | Wang | B60C 23/0408 340/442 |
| 8,607,627 | B2* | 12/2013 | Hilt | B60C 23/041 73/146.5 |
| 8,955,566 | B2* | 2/2015 | Loewe | B60C 23/004 152/418 |
| 9,452,646 | B2* | 9/2016 | Kanenari | B60C 23/04 |
| 9,630,461 | B2* | 4/2017 | Serbu | B60C 23/0494 |
| 9,837,570 | B2* | 12/2017 | Retti | F02M 21/0227 |
| 2004/0078662 | A1 | 4/2004 | Hamel et al. | |
| 2005/0248447 | A1 | 11/2005 | Yaqub et al. | |
| 2007/0063829 | A1* | 3/2007 | Chien | B60C 23/041 340/447 |
| 2009/0207011 | A1* | 8/2009 | Wang | B60C 23/041 340/448 |

FOREIGN PATENT DOCUMENTS

| | | |
|---|---|---|
| DE | 102010011124 A1 | 12/2011 |
| EP | 0520271 A1 | 12/1992 |
| JP | 2004268746 A1 | 9/2004 |
| JP | 2005022457 A1 | 1/2005 |
| WO | 2004045875 A1 | 6/2004 |

OTHER PUBLICATIONS

International Search Report and Written Opinion for International Application No. PCT/FR2017/053147, dated Jan. 8, 2018—8pages.

* cited by examiner

ELECTRONIC UNIT OF A SYSTEM FOR MONITORING TYRE PARAMETERS EQUIPPED WITH A RECHARGEABLE ELECTRICAL SUPPLY MEANS

CROSS REFERENCE TO RELATED APPLICATIONS

This application is the U.S. National Phase Application of PCT International Application No. PCT/EP2017/053147, filed Nov. 17, 2017, which claims priority to French Patent Application No. 1661260, filed Nov. 21, 2016, the contents of such applications being incorporated by reference herein.

FIELD OF THE INVENTION

The present invention relates to the automotive field and relates more particularly to an electronic unit for a system for monitoring tire parameters (referred to as a TPMS, for tire-pressure monitoring system), which is intended to be mounted on a valve of a wheel of a vehicle and includes a rechargeable power supply means. The invention further extends to a method for managing the charging of the rechargeable means for supplying power to the electronic unit according to the invention. It also relates to a system for monitoring at least one parameter of a tire.

BACKGROUND OF THE INVENTION

For safety reasons, motor vehicles are increasingly being fitted with TPMSs.

These monitoring systems are conventionally provided with both:
- electronic units (also called "wheel units") that are mounted on each of the wheels of the vehicle and incorporate sensors for measuring parameters such as the radial acceleration of the wheel and the pressure and temperature of the tire with which this wheel is fitted, and further include a microcontroller, a memory and a radiofrequency emitter; and
- a central unit (not shown, mounted on the vehicle) for receiving the signals emitted by the radiofrequency emitters of each wheel, including an electronic computer (or ECU, for electronic control unit), incorporating a radiofrequency receiver connected to an antenna.

These electronic units periodically provide the central unit with measurements of basic parameters pertaining to each tire—pressure, temperature, acceleration, etc. These measurements may then be exploited in target applications, in particular:
- automatic learning by the sensors or tracking the position of the sensors themselves;
- locating the wheels so as to monitor the pressure of the tire corresponding to each located wheel;
- detecting tire overload and tire wear.

The measurements, taken by dedicated sensors, are converted and transmitted to a microprocessor incorporated into the central unit via transceiver devices provided with antennas and a CAN bus. The microcontroller of the electronic unit transmits these pressure, acceleration and temperature data via a radiofrequency emitter module to the central processing unit of the TPMS with which the vehicle is fitted. Conversely, this central processing unit transmits low-frequency (LF) control data to the microcontroller. The set of implemented means (sensors, central unit, communication network using the emitters/receivers/transceivers) forms a tire-pressure monitoring system known conventionally by the abbreviation TPMS.

The numerical data delivered by the electronic units to the central unit represent successive levels of variation. From these values, the central processing unit may, after filtering and sampling, formulate pressure, temperature, wear and/or overload signals for the purpose of transmitting these to the vehicle onboard computer.

Tire monitoring is carried out several times over a journey and even when the vehicle is at standstill. The batteries for supplying power to the TPMSs are therefore frequently called upon.

Thus, one important aspect of the use of TPMSs relates to energy consumption, in particular to the energy consumption of the electronic units. Specifically, these electronic units, which use wireless communication means for long periods of time, are supplied with power by energy sources of limited capacity. Generally, the energy required for the electronic units to operate is supplied by a button cell battery. This battery includes a fixed charge guaranteeing the operation of the electronic unit for a mean duration of 10 years.

The main drawback of the batteries for electronic units is that just the internal leakage current of the battery represents nearly 30% of its capacity, even though the battery is oversized so as to be able to guarantee an average service life of 10 years (which nowadays corresponds to a duration longer than the service life of a tire). Thus, the battery represents 20% of the total weight of the electronic unit, which negatively affects the mechanical performance of the electronic unit.

Moreover, the energy capacity of the battery determines the number of functions that may be managed by the electronic unit, such that limiting the energy capacity of the battery limits the number of applications that may be provided by TPMSs. Furthermore, it is difficult to reduce the use of the applications that may be provided by TPMSs without negatively affecting their monitoring function.

Lastly, the cost of the battery for the electronic unit contributes substantially to the total cost of said wheel unit.

One palliative solution, described in particular in the patent US2004/0078662, incorporated herein by reference, consisted in envisaging the replacement of the button cells with power supply means including a piezoelectric element that-is able to transform the mechanical energy from the rotation and vibrations of the wheels into electrical energy.

According to this principle, the power supply means produce renewable energy, and the service life of the wheel units is therefore theoretically unlimited.

However, the amount of energy produced by piezoelectric elements is relatively small and, currently, this amount of energy is too small to supply sufficient power to the various electronic components that are incorporated into the wheel units, in particular when it comes to obtaining acceptable periodicity, i.e. a sufficiently high periodicity, of the sequences for measuring the operating parameters of the wheels.

SUMMARY OF THE INVENTION

An aspect of the present invention is a palliative solution to the use of button cells, an aspect of which is to provide power supply means that are capable of producing renewable energy.

To this end, power supply means (for a tire-pressure monitoring system) using the Peltier effect and transforming a temperature gradient across a wheel into electrical energy are already known from the documents JP 2005 022457, JP 2004 268746 and US 2005/248447, each incorporated herein by reference. However, the amount of electrical energy thus produced is small since the temperature gradient across the wheel is difficult to harness and to exploit optimally.

An aspect of the present invention is to provide an alternative solution that is free of the aforementioned disadvantages.

According to an aspect of the invention, this is achieved, in the first instance, by an electronic unit that is intended to be mounted on the valve of a vehicle wheel fitted with a tire, incorporating electronics for monitoring at least one operating parameter of said wheel and a rechargeable means for supplying power to said electronics, said electronic unit being noteworthy in that it comprises means for charging the rechargeable power supply means, these charging means including:
- a movable element, at least a portion of which is magnetized, that is capable of being set in motion by an air flow for inflating the tire that passes through the valve and of cooperating with a coil so as to produce variations in the magnetic field and electromagnetic induction; and
- a device for managing the charging of the rechargeable power supply means.

The electronic unit according to an aspect of the invention affords several beneficial advantages. In particular:
- the size and the weight of the battery of the wheel unit are decreased, and the mechanical performance thereof is consequently improved, through the use of rechargeable battery technology;
- the effects of the leakage current are decreased through the use of rechargeable power supply technology;
- the cost of the battery, which is proportional to its size, is decreased;
- the service life of the sensor is extended beyond the current limit of 10 years;
- the addition of new functions is facilitated for the same cost and mechanical performance.

According to one preferred exemplary embodiment, the movable element consists of a rod provided with fins, the resistance of which to the air flow for inflating the tire that passes through the valve allowing said rod to be set in rotation about an axis of rotation.

According to one advantageous exemplary embodiment, the coil consists of the coil of a low-frequency receiver module allowing low-frequency control data to be received from a central processing unit.

In this way, this feature affords the beneficial advantage of having a single low-frequency coil for both carrying out communications between the electronic unit and the central processing unit of the TPMS and charging the battery of said electronic unit.

According to one preferred exemplary embodiment, the device for managing the charging of the rechargeable power supply means is a charging circuit.

According to another advantageous exemplary embodiment, the device for managing the charging of the rechargeable power supply means includes a charge pump.

According to one advantageous exemplary embodiment, the electronic unit further includes an AC-to-DC converter circuit.

An aspect of the present invention further relates to a method for managing the charging of the rechargeable means for supplying power to an electronic unit produced according to any one of the aforementioned features, this method being noteworthy in that it includes the following steps:
- monitoring the voltage across the terminals of the rechargeable power supply means;
- notifying of the need to inject an inflating air flow into a tire bearing the electronic unit, the voltage of which across the terminals of the rechargeable power supply means that it includes is lower than a predetermined threshold;
- monitoring the voltage across the terminals of the coil;
- triggering the device for managing the charging of the rechargeable power supply means for charging the latter when the voltage across the terminals of the coil is higher than a predetermined threshold.

An aspect of the present invention further relates to a system for monitoring at least one parameter of a tire of a wheel of a vehicle, which is noteworthy in that it comprises at least one electronic unit produced according to any one of the aforementioned features, mounted on the valve of said wheel.

BRIEF DESCRIPTIONS OF THE DRAWINGS

Other objects, features and advantages of an aspect of the present invention will become apparent from the following description, provided by way of non-limiting example with reference to the appended drawings, in which.

DETAILED DESCRIPTION OF THE PREFERRED EMBODIMENTS

Figure 1:
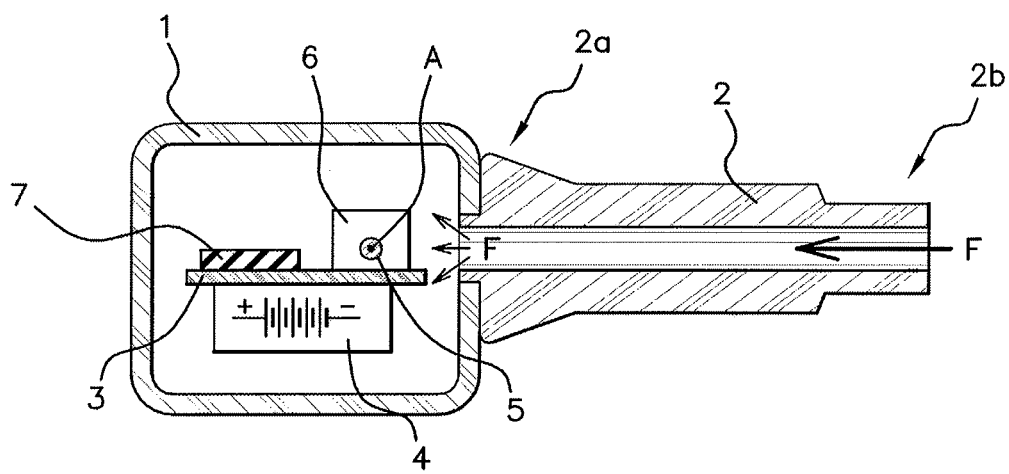
FIG. 1 is a view of schematic nature in longitudinal section of the electronic unit according to an aspect of the invention.

An aspect of the present invention is applicable to the electronic units 1, also called "wheel units", of TPMSs, which are capable of being mounted on the valve 2 for inflating the tire of a wheel of a vehicle (not illustrated). This inflation valve 2 has a proximal end 2a that is capable of being connected, in a manner known per se, to the electronic unit 1, and a distal end 2b that is capable of accepting a tool for inflating the tire of the wheel of the vehicle, or a cap. The TPMS according to an aspect of the invention is therefore a monitoring system that is comparable to those of the prior art but includes an electronic unit 1 such as described in the present application.

In this configuration, the electronic unit 1 is arranged as close as possible to the valve 2 and hence is subjected to an air flow F for inflating the tire that passes through said valve 2.

The electronic unit incorporates, in a manner known per se, electronics known per se for monitoring at least one operating parameter of said wheel, such as the pressure, the electronic components of which (not illustrated) are mounted on a printed circuit board (PCB) 3. The electronic unit further includes a rechargeable means for supplying power to said electronics, such as for example a rechargeable battery 4.

Figure 2:
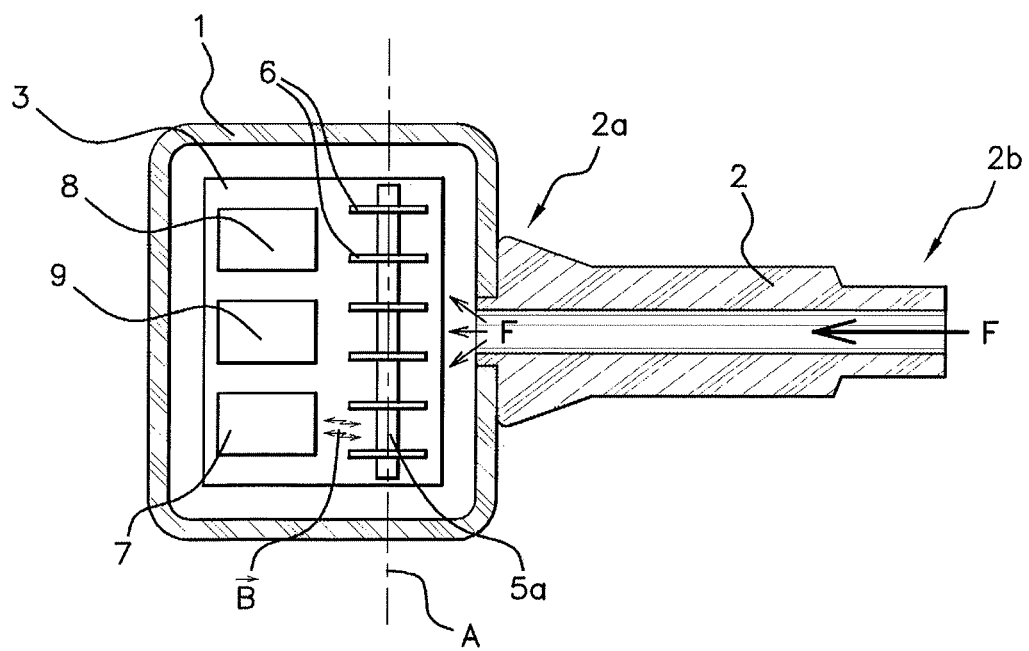
FIG. 2 is a view from above of schematic nature of the electronic unit according to an aspect of the invention.
Figure 3:
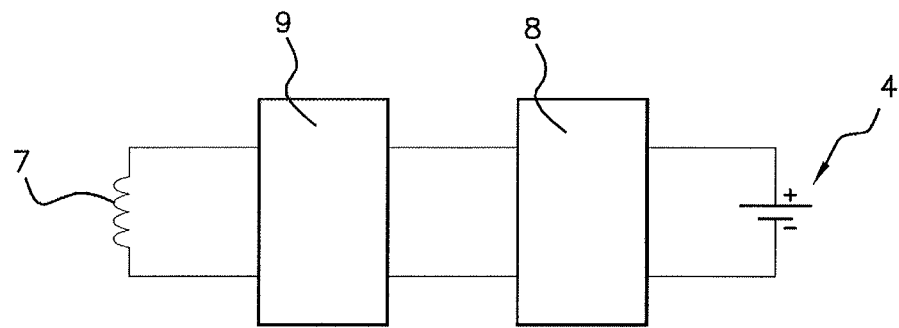
FIG. 3 is a view illustrating the circuit diagram of a first embodiment of the electronic unit according to an aspect of the invention.
Figure 4:
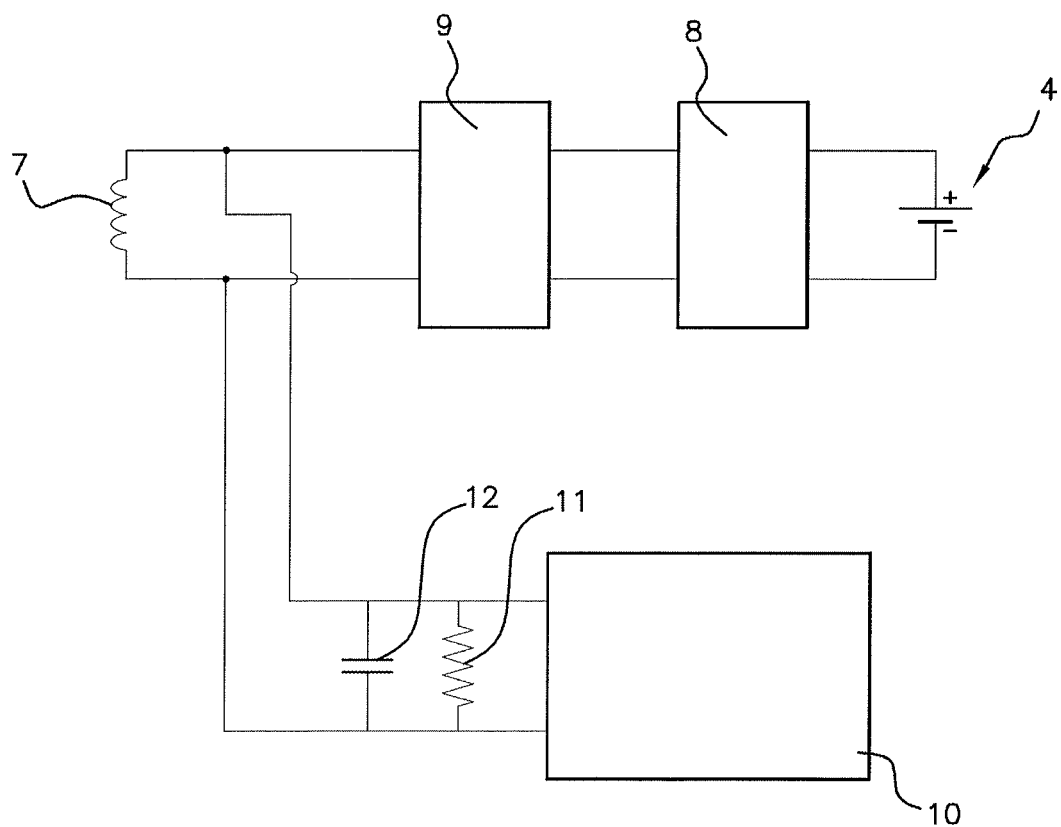
FIG. 4 is a view illustrating the circuit diagram of a second embodiment of the electronic unit according to an aspect of the invention.

According to an aspect of the invention, the means for charging the rechargeable battery 4 comprise a movable element, at least a portion of which is magnetized, that is capable of being set in motion by an air flow F for inflating the tire that passes through the valve 2. According to the exemplary embodiment illustrated in FIGS. 1 and 2, the movable element, arranged on the PCB 3 in proximity to the proximal end 2a of the valve 2, consists of a rod 5 provided with a plurality of fins 6, the resistance of which to the air flow F for inflating the tire that passes through the valve 2 allowing said rod 5 to be set in rotation about an axis A of rotation when the tire of the wheel of the vehicle is being inflated.

This movable rod 5 is configured to cooperate with a coil 7 so as to give rise to electromagnetic induction. To achieve this, the rod 5 is at least partly magnetized. For example, the rod 5 is magnetized at an end portion 5a that is positioned facing the section of the coil 7. According to another exemplary embodiment, the rod 5 is completely magnetized.

Thus, when the tire of the wheel of the vehicle is being inflated, since the air flow F for inflating the tire is under substantial pressure, it results in the rod 5 being set in rotation about its axis A, which then gives rise to a variation in a magnetic field $\vec{B}$ at the tip of the magnetized end portion 5a of the rod 5. This variation in the magnetic field $\vec{B}$ then induces an AC voltage across the terminals of the coil 7, according to the well-known principle of electromagnetic induction, constituting a voltage source for a device 8 for managing the charging of the rechargeable battery 4, described below.

Advantageously, an AC-to-DC converter circuit 9 is arranged at the output of the coil 7. This converter, allowing an AC current at the output of the coil 7 to be converted into a DC current at the input of the device 8 for managing the charging of the rechargeable battery 4, consists for example of a diode-bridge voltage rectifier, and a low-pass filter, known per se.

The device 8 for managing the charging of the rechargeable battery 4 is for example a charging circuit, known per se. Since this charging circuit 8 is supplied with power by said rechargeable battery 4 and by the output voltage of the circuit 9 too, it is for example configured to be activated only when the voltage across the terminals of the circuit 9 is sufficient to activate a function of charging the rechargeable battery 4.

According to another example (not illustrated), the device 8 for managing the charging of the rechargeable power supply means consists of a charge pump, known per se.

Advantageously, the coil 7 consists of the low-frequency coil of a low-frequency receiver module 10 known per se and further comprising a resistor 11 and a capacitor 12. This low-frequency receiver module 10 allows low-frequency control data to be received, by the electronic unit 1, from a central processing unit (not illustrated), located on the vehicle, of the TPMS.

The TPMS is configured, in a manner known per se, to notify the driver of a vehicle of a need to correct the pressure of the one or more tires of the vehicle in the event of observed deflation or insufficient pressure. Since tires therefore have to be reinflated regularly, and the air flow F for inflating the tires thus cooperates with the charging means 5-7-8-9 so that the rechargeable battery 4 is charged regularly, it is thus possible, according to an aspect of the invention, to have a power source for the electronics of the electronic unit of a TPMS that is unlimited.

However, if the tire pressure is already satisfactory but the charge of the rechargeable battery 4 is low, it must be possible to be able to charge the rechargeable battery 4.

Figure 5:
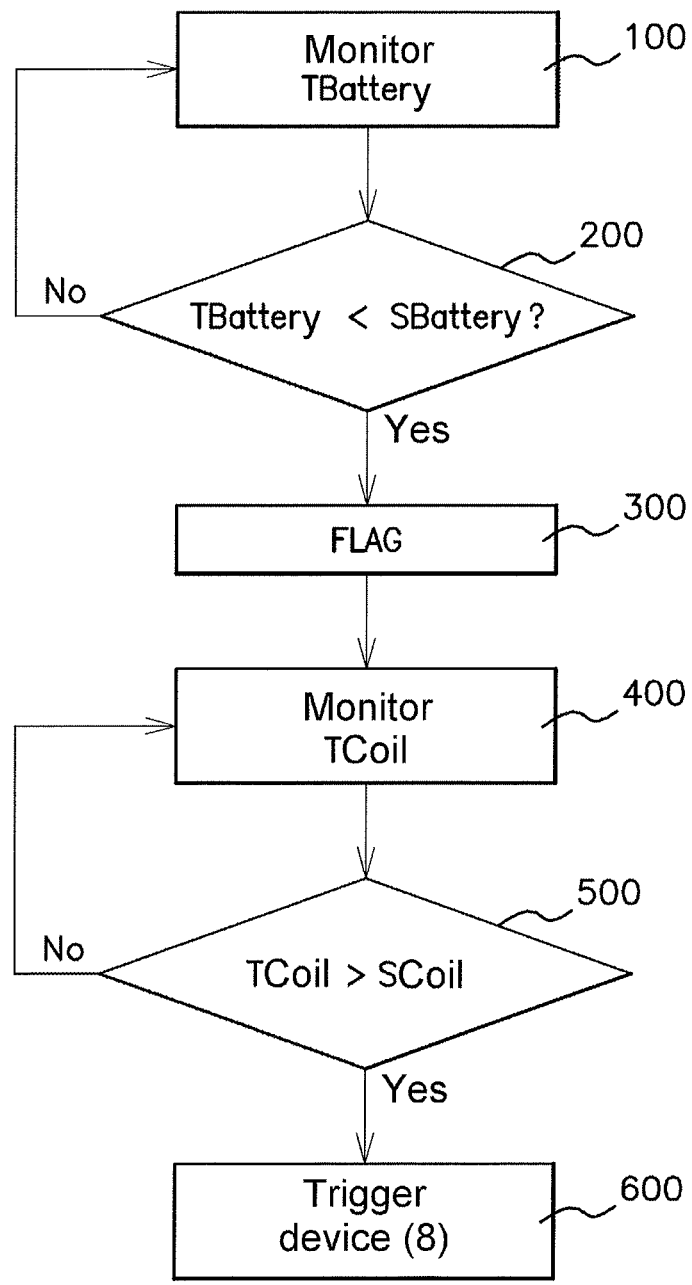
FIG. 5 is a flow chart illustrating the charging management method according to an aspect of the invention.

Thus, according to the exemplary implementation of the method for managing the charging of the rechargeable battery 4 illustrated in FIG. 5, the voltage $T_{Battery}$ across the terminals of the rechargeable battery 4 is monitored (step 100) in a manner known per se. The TPMS including an electronic unit 1 according to an aspect of the invention may further be configured to notify (step 300) the driver of a vehicle, for example via a FLAG indicator on its instrument panel, of a need to inflate the tire including the electronic unit 1, the voltage $T_{Battery}$ of which across the terminals of said battery 4 is lower than a predetermined threshold $S_{Battery}$ (step 200), so as to trigger an accumulation of electrical energy through electromagnetic induction across the terminals of the coil 7 by means of the inflating air flow F, as described above.

The voltage $T_{Coil}$ across the terminals of the coil 7 is monitored in a manner known per se (step 400). The circuit 8 for charging the rechargeable battery 4 is configured to be triggered (step 600) only when the voltage $T_{Coil}$ across the terminals of the coil 7 is higher than a predetermined threshold $S_{Coil}$ (step 500). Thus, the operation of switching between a position for accumulating electrical energy across the terminals of the coil 7 and a position for charging the rechargeable battery 4 is a functional switching operation. Such a switching operation could also be performed by a switch of on-off type (not shown), in a manner known per se. For example, a microcontroller (not shown), with which the electronic unit 1 of the TPMS is conventionally provided, allows the switch to be controlled and said operation of charging the rechargeable battery 4 to be triggered.

If, after charging the rechargeable battery 4, the tire pressure is higher than the recommended pressure, the TPMS instructs the driver of the vehicle to deflate the tire to return to a recommended pressure, the temporary overinflation thus having allowed the rechargeable battery 4 to be charged.

The electronic unit 1 according to an aspect of the invention may further include a fixed power supply means (such as a button cell) in addition to the rechargeable power supply means 4 according to an aspect of the invention.

Aspects of the present invention have been described in the context of an electronic unit of a TPMS mounted on a valve and hence in the presence of an air flow for inflating a tire. However, aspects of this invention could be applied in the same way for any electronic unit in the presence of a flowing fluid that needs to be supplied with electrical energy, such as for example an exhaust gas sensor, an air supply sensor, a water flow sensor, etc.

The invention claimed is:

1. An electronic unit that is intended to be mounted on a valve of a vehicle wheel fitted with a tire, incorporating electronics for monitoring at least one operating parameter of said wheel and a rechargeable means for supplying power to said electronics, including means for charging the rechargeable power supply means, the means for charging comprising:

a movable element, at least a portion of which is magnetized, that is configured to be set in motion by an air flow for inflating the tire that passes through the valve and configured to interact with a coil so as to produce variations in the magnetic field and electromagnetic induction; and a device for managing the charging of the rechargeable power supply means.

2. The electronic unit as claimed in claim 1, wherein the movable element comprises a rod provided with fins, a resistance of which to the air flow for inflating the tire that passes through the valve allowing said rod to be set in rotation about an axis of rotation.

3. The electronic unit as claimed in claim 2, wherein the coil comprises a coil of a low-frequency receiver module allowing low-frequency control data to be received from a central processing unit.

4. The electronic unit as claimed in claim 1, wherein the coil comprises a coil of a low-frequency receiver module allowing low-frequency control data to be received from a central processing unit.

5. The electronic unit as claimed in claim 1, wherein the device for managing the charging of the rechargeable power supply means is a charging circuit.

6. The electronic unit as claimed in claim 1, wherein the device for managing the charging of the rechargeable power supply means includes a charge pump.

7. The electronic unit as claimed in claim 1, further comprising an AC-to-DC converter circuit.

8. A method for managing charging of the rechargeable means for supplying power to an electronic unit produced as claimed in claim 1, the method comprising:
monitoring a voltage across terminals of the rechargeable power supply means;
notifying of the need to inject an inflating air flow into a tire bearing the electronic unit when the voltage across the terminals of the rechargeable power supply means is lower than a first predetermined threshold;
monitoring a voltage across terminals of the coil; and
triggering the device for managing the charging of the rechargeable power supply means for charging the rechargeable power supply means when the voltage across the terminals of the coil is higher than a second predetermined threshold.

9. A system for monitoring at least one parameter of a tire of a wheel of a vehicle, comprising at least one electronic unit produced as claimed in claim 1, mounted on the valve of said wheel.

10. The electronic unit as claimed in claim 1, wherein the device uses the electromagnetic induction as a voltage source for the charging of the rechargeable power supply means.

* * * * *